(12) United States Patent
Jeng et al.

(10) Patent No.: US 6,790,257 B2
(45) Date of Patent: Sep. 14, 2004

(54) AIRFLOW FEEDBACK CONTROL METHOD AND APPARATUS FOR FAN FILTER UNIT

(75) Inventors: Ming-Shan Jeng, Hsinchu (TW); Meen-Dau Hoo, Hsinchu (TW); Juhn-Jie Chen, Hsinchu (TW); Kuo-Hsiang Yang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 2 days.

(21) Appl. No.: 10/339,490

(22) Filed: Jan. 10, 2003

(65) Prior Publication Data

US 2004/0112212 A1 Jun. 17, 2004

(51) Int. Cl.$^7$ .............................................. B01D 37/04
(52) U.S. Cl. ...................... 95/19; 55/385.2; 55/385.6; 95/22; 96/400; 96/421
(58) Field of Search .................. 95/19, 22; 96/400, 96/402, 421; 55/385.2, 385.6

(56) References Cited

U.S. PATENT DOCUMENTS

| | | | | |
|---|---|---|---|---|
| 4,784,675 A | * | 11/1988 | Leber et al. .................. 96/110 |
| 4,786,295 A | * | 11/1988 | Newman et al. .............. 96/400 |
| 4,820,317 A | * | 4/1989 | Fahey ............................ 95/22 |
| 4,921,509 A | * | 5/1990 | Maclin .......................... 96/18 |
| 5,074,894 A | * | 12/1991 | Nelson ......................... 96/224 |
| 5,261,935 A | * | 11/1993 | Ishii et al. .................... 96/400 |
| 5,476,000 A | * | 12/1995 | Henderson et al. ......... 73/23.27 |
| 5,545,252 A | * | 8/1996 | Hinshaw et al. ............... 95/15 |
| 5,800,579 A | * | 9/1998 | Billingsley et al. ........... 55/337 |
| 5,972,075 A | * | 10/1999 | Fukuda et al. ................. 95/15 |
| 6,423,118 B1 | * | 7/2002 | Becerra et al. ................ 95/19 |
| 6,620,041 B2 | * | 9/2003 | Webb ......................... 454/186 |

FOREIGN PATENT DOCUMENTS

| | | | | |
|---|---|---|---|---|
| DE | 2529908 | * | 1/1977 | .................... 95/19 |
| JP | 5-115731 | * | 5/1993 | .................... 95/22 |

* cited by examiner

Primary Examiner—Richard L. Chiesa
(74) Attorney, Agent, or Firm—Birch, Stewart, Kolasch & Birch, LLP

(57) ABSTRACT

An airflow feedback control method and apparatus for fan filter unit (FFU) is proposed, which is designed for use with a fan filter unit that is widely used in semiconductor fabrication factories for dust-clearing purpose, for controlling the fan filter unit to generate a constant amount of airflow equal to a preset desired amount. The proposed FFU airflow feedback control method and apparatus is characterized by that it utilizes bell inlet as an airflow measuring nozzle and that airflow is used as feedback parameter to control the FFU, rather than utilizing motor speed as feedback parameter by prior art. This feature allows the fan filter unit to continuously generate a fixed amount of airflow equal to the preset desired amount even if there is a pressure change at the site of installation, thus lessening the problems of insufficient air change rate and sideward-going airflows.

11 Claims, 3 Drawing Sheets

AIRFLOW FEEDBACK CONTROL METHOD AND APPARATUS FOR FAN FILTER UNIT

BACKGROUND OF THE INVENTION

1. Field of the Invention

This invention relates to feedback control technology, and more particularly, to an airflow feedback control method and apparatus for fan filter unit (FFU), which is designed for use with a fan filter unit that is widely used in semiconductor fabrication factories, for controlling the fan filter unit to generate an amount of airflow equal to a preset desired amount.

2. Description of Related Art

Fan filter unit (FFU) is a widely used dust-clearing device in the semiconductor industry for installation in cleanrooms, typically on the ceiling, for the purpose of generating a downstream of airflow from the top for the purpose of blowing away dust particles or any other tiny dirt objects in the cleanroom so as to provide a substantially dust-free environment for the fabrication of semiconductor chips.

FIG. 1 is a schematic diagram showing a sectional view of a conventional fan filter unit 10, which includes a fan rotor 11 and a bell inlet 12, wherein the bell inlet 12 has an inwardly-tapered air passage with a circularly-curved inner wall 13. When the fan rotor 11 rotates, it can suck air from the atmosphere into the inlet 21 and generate a downward-going airflow which flows via the outlet 22 to the bottom of the fan filter unit 10, thereby outputting a downstream of airflow for dust-clearing purpose.

Fundamentally, it is desired that fan filter units be capable of continuously generating a fixed and unchanging amount of airflow to the cleanroom; to ensure the cleaning capability of the airflow system. In addition, when a plurality of fan filter units are installed in array in a cleanroom, it is highly desired that all of the fan filter units in the array all generate an equal amount of airflow; otherwise, it would undesirably cause sideward-going airflows that would degrade the dust-clearing effect.

One solution to the aforementioned problem is to make all fan filter units run at the same speed. However, in practice, it would be highly difficult to set all fan filter units to run at exactly the same speed. A minor difference in speed would nevertheless cause the problem of sideward-going airflows.

Another solution to the aforementioned problem is to use a speed feedback control method to control each fan filter unit to run at a preset desired speed. In practice, however, even though it is feasible to control each fan filter unit to run at a preset desired speed, the airflow amount would nevertheless be affected by a change in the air pressure or a nonuniform distribution of the air pressure in the cleanroom, which can be caused by, for example, a change in the amount of equipment or personnel in the cleanroom, inappropriate cleanroom design, refashion to the cleanroom, replacement of the filter in the fan filter unit, and so on. Under these conditions, the amount of airflow from a fixed-speed fan filter unit would nevertheless be deviated from the desired amount.

SUMMARY OF THE INVENTION

It is therefore an objective of this invention to provide an airflow feedback control method and apparatus for controlling a fan filter unit to continuously generate an amount of airflow equal to a preset desired amount irrespective of any changes in the air pressure in the cleanroom.

The airflow feedback control method and apparatus for fan filter unit according to the invention is characterized by that it utilizes airflow as feedback parameter, rather than utilizing motor speed as feedback parameter by prior art. This feature allows the fan filter unit to continuously generate a fixed amount of airflow equal to a preset desired amount even if there is a pressure change at the site of installation. The FFU airflow feedback control method and apparatus of the invention is therefore more advantageous to use than prior art.

DETAILED DESCRIPTION OF THE PREFERRED EMBODIMENTS

The airflow feedback control method and apparatus for fan filter unit (FFU) according to the invention is disclosed in full details by way of preferred embodiments in the following with reference to FIG. 2 through FIG. 4.

Figure 1:
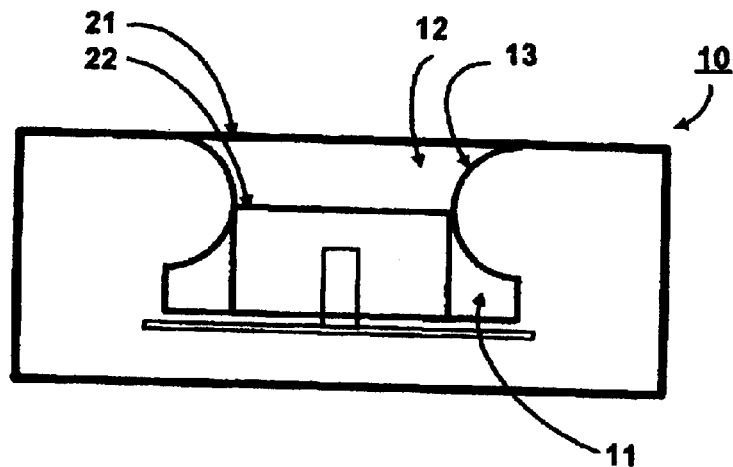
FIG. 1 (PRIOR ART) is a schematic diagram showing a sectional view of a conventional fan filter unit.
Figure 2:
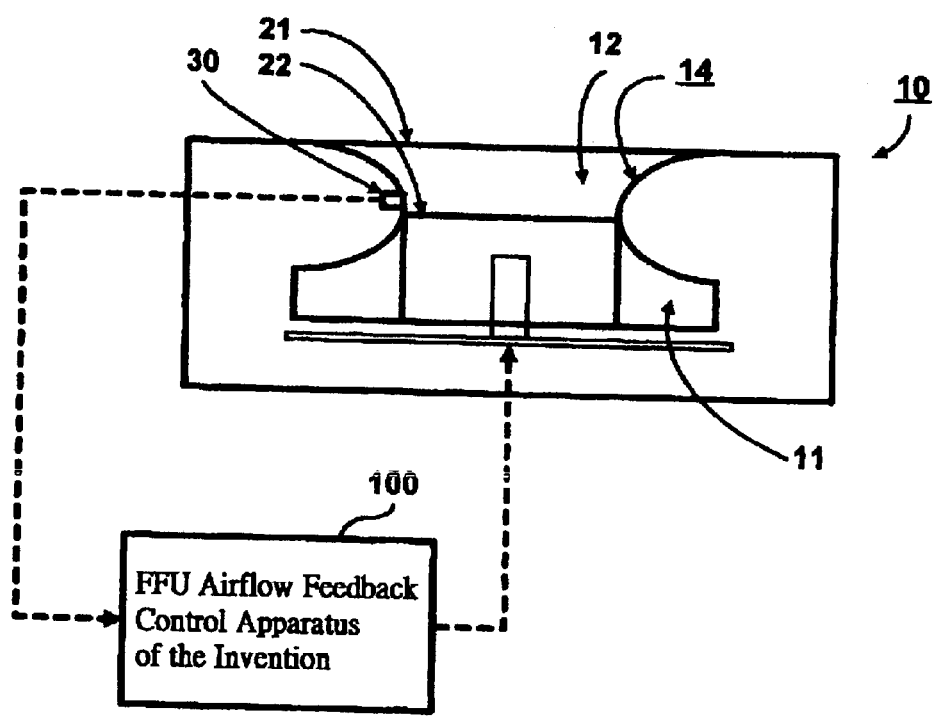
FIG. 2 is a schematic diagram showing the coupling of the airflow feedback control apparatus of the invention to a single fan filter unit.

FIG. 2 is a schematic diagram showing the coupling of the FFU airflow feedback control apparatus of the invention 100 to a single fan filter unit 10. This fan filter unit 10 is substantially identically in structure as the conventional one shown in FIG. 1, except that the bell inlet 12 is here modified to have an elliptically-shaped inner wall 14 (rather than the circularly-curved inner wall 13 shown in FIG. 1) based on experiment results that indicate that elliptically-curved inner wall would help allow more accurate feedback control results than circularly-curved inner wall since airflow is more smooth over elliptically-curved surfaces. The bell inlet therefore acts as a nozzle for airflow measurement. The FFU airflow feedback control apparatus of the invention 100 is capable of controlling the fan filter unit 10 to continuously provide a substantially fixed amount of airflow equal to a preset desired amount.

Figure 3:
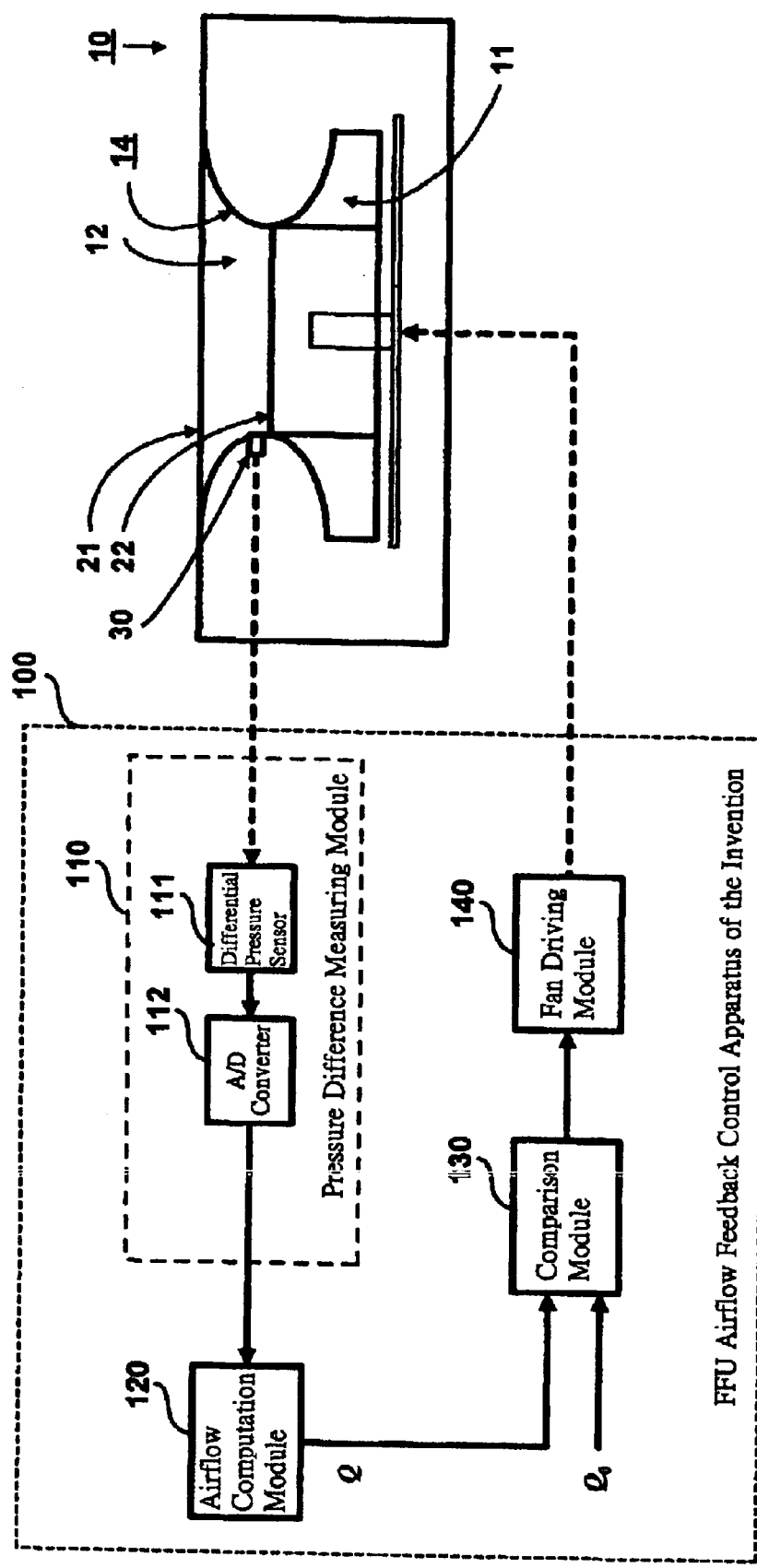
FIG. 3 is a schematic block diagram showing the inside architecture of the airflow feedback control apparatus of the invention.

As shown in FIG. 3, the FFU airflow feedback control apparatus of the invention 100 comprises: (a) a differential pressure measuring module 110; (b) an airflow computation module 120; (c) a comparison module 130; and (d) a fan driving module 140.

The differential pressure measuring module 110 is used to measure the air pressure difference $\Delta P$ between the outlet 22 and the inlet 21 of the bell inlet 12 on the fan filter unit 10 and the upstream pressure.

In this preferred embodiment of the invention, the differential pressure measuring module 110 is composed of a pressure sensor 111 and an A/D (analog to digital) converter 112. The pressure sensor 111 is installed on the bell inlet 12 on the fan filter unit 10 at a position proximate to the outlet 22 (the installation location is indicated by the reference numeral 30 in FIG. 3). The pressure sensor 111 is capable of sensing the pressure difference and converting the sensed air pressure $\Delta P$ into an electrical signal in analog form whose magnitude indicates the magnitude of the sensed pressure difference. The output analog signal from the pressure sensor 111 is subsequently converted by the A/D converter 112 into digital form. The digital value of ΔP is then transferred to the airflow computation module 120 for further processing.

The airflow computation module 120 is capable of computing for the airflow amount (represented by Q) corresponding to the present pressure difference ΔP between the outlet 22 and the FFU upstream pressure. There are two methods to obtain the value of Q: (1) by using a theoretical equation of airflow versus pressure difference as given in the following Eq. (A); (2) by mapping the value of ΔP against an empirically-obtained characteristic curve of airflow versus pressure difference.

$$Q = 265.7 * Y * \sqrt{\frac{\Delta P}{\rho} * Cn * An} \qquad \text{Eq. (A)}$$

where
- Q: airflow amount (cmm)
- Y: expansion coefficient
- ΔP: air pressure between inlet 21 and outlet 22 (mmAq)
- ρ: air density at inlet 21 (Kg/m$^3$)
- Cn: flow coefficient
- An: cross-sectional area of outlet 22 (m$^2$)

However, since the above Eq. (A) is based on theoretical deduction, its result could be inaccurate due to many changing factors in real world (for example, the value of $C_n$ and Y would be different under different conditions). Therefore, the best mode of embodiment of the invention is to utilize the second method, i.e., by mapping the value of ΔP against an empirically-obtained characteristic curve of airflow versus pressure difference.

Figure 4:
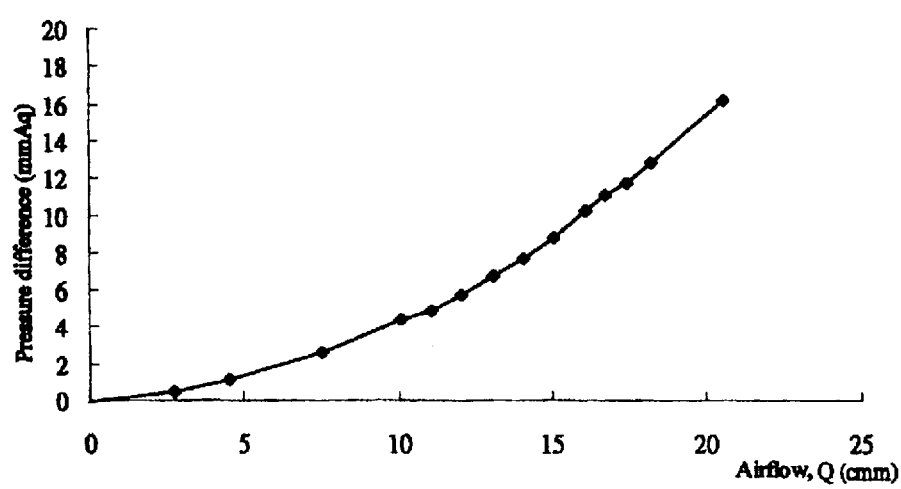
FIG. 4 is a graph showing an example of the characteristic curves of airflow versus pressure difference between the inlet and outlet of a fan filter unit.

FIG. 4 is a graph showing an example of the characteristic curves of airflow Q versus pressure difference ΔP between the nozzle outlet 22 and the upstream pressure of the fan filter until 10. It is noted that different fan filter units would have different Q-ΔP characteristic curves, and therefore the data shown in FIG. 4 is only for demonstrative purpose. The Q-ΔP characteristic curve can be converted into numerical data and prestored into the airflow computation module 120. When the airflow computation module 120 receives an input ΔP, it then uses the input ΔP as a parameter to find the corresponding value of Q. The output value of Q from the airflow computation module 120 is then transferred to the comparison module 130 for further processing.

The comparison module 130 is capable of comparing the value of Q against a pre-set constant value $Q_0$ that represents a user-defined amount of airflow from the fan filter unit 10, and thereby generate an airflow error signal ΔQ, where ΔQ=Q−$Q_0$. If ΔQ>0, it indicates that the fan filter unit 10 is currently generating an overly large amount of airflow to the cleanroom; whereas if ΔQ<0, it indicates that the fan filter unit 10 is currently generating an overly small amount of airflow; and if ΔQ=0, it indicates that the fan filter unit 10 is currently generating an amount of airflow equal to the desired amount.

The fan driving module 140 is responsive to the airflow error signal ΔQ to accordingly increase or decrease the speed of the fan rotor 11 of the fan filter unit 10 for the purpose of adjusting the airflow from the fan filter unit 10 to the targeted amount $Q_0$. More specifically, when ΔQ>0 (which indicates that the fan filter unit 10 is currently generating an overly large amount of airflow), it causes the fan driving module 140 to decrease the speed of the fan filter unit 10 to thereby decrease the amount of airflow therefrom; whereas when ΔQ<0 (which indicates that the fan filter unit 10 is currently generating an overly small amount of airflow), it causes the fan driving module 140 to increase the speed of the fan filter unit 10 to thereby increase the amount of airflow therefrom; and when ΔQ=0 (which indicates that the fan filter unit 10 is currently generating an amount of airflow equal to the desired amount), it performs no adjustment to the fan driving module 140 so as to maintain the fan filter unit 10 at its current speed. If the fan filter unit 10 is increased or decreased in speed, the changed airflow will cause a change in the pressure difference ΔP between the outlet 22 and the inlet 21, which is then detected by the differential pressure measuring module 110 and fed back via the airflow computation module 120 and the comparison module 130 to the fan driving module 140 to make further adjustments to the speed of the fan filter unit 10. This feedback control is continued repeatedly until reaching the condition of ΔQ=0, i.e., when the amount of airflow Q from the fan filter unit 10 is equal to the preset desired amount $Q_0$. Since the feedback control takes airflow amount as feedback parameter, it allows the fan filter unit 10 to be capable of continuously generating a fixed amount of airflow even if there is a pressure change at the site of installation.

In conclusion, the invention provides an airflow feedback control method and apparatus for fan filter unit, which is characterized by that it utilizes airflow as feedback parameter, rather than utilizing motor speed as feedback parameter by prior art. This feature allows the fan filter unit to continuously generate a fixed amount of airflow equal to a preset desired amount even if there is a pressure change at the site of installation. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An airflow feedback control method for use with a fan filter unit of the type having a fan rotor and a bell nozzle having an inlet and an outlet, for the purpose of controlling the fan filter unit to generate a constant amount of airflow equal to a preset desired amount;

the airflow feedback control method comprising the steps of:
   (1) measuring the pressure difference between the inlet and the outlet of the fan filter unit;
   (2) obtaining the value of airflow amount corresponding to the pressure difference between the inlet and the outlet of the fan filter unit;
   (3) comparing the value of airflow amount against a preset value representing the desired airflow amount to thereby obtain an airflow error signal; and
   (4) utilizing the airflow error signal to adjust the speed of the fan filter unit to thereby adjust the amount of airflow from the fan filter unit; and then utilizing the newly-resulted pressure difference between the inlet and the outlet as feedback parameter to obtain a new airflow error signal to adjust the speed of the fan rotor until the amount of airflow from the fan filter unit is substantially equal to the preset desired amount.

2. The airflow feedback control method of claim 1, wherein in said step (1), a pressure sensor is installed at a position proximate to the outlet of the bell nozzle of the fan filter unit to sense the pressure at the installed position; and the pressure difference between the inlet and the outlet is obtained by obtaining the difference between the sensed pressure and the upstream pressure.

3. The airflow feedback control method of claim 1, wherein in said step (2), the value of airflow amount corresponding to the pressure difference between the upstream and the bell nozzle outlet is obtained by using a theoretical equation that represents the relation between airflow and pressure difference.

4. The airflow feedback control method of claim 1, wherein the value of airflow amount corresponding to the pressure difference between the upstream and the bell nozzle outlet is obtained by mapping the value of detected pressure difference against an empirically-obtained characteristic curve of airflow versus pressure difference.

5. An airflow feedback control apparatus for use with a fan filter unit of the type having a fan and a bell nozzle having an inlet and an outlet, for the purpose of controlling the fan filter unit to generate a constant amount of airflow equal to a preset desired amount;
the airflow feedback control apparatus comprising:
a differential pressure measuring module for measuring the pressure difference between the upstream and the bell nozzle outlet;
an airflow computation module for computing for the value of airflow amount corresponding to the pressure difference;
a comparison module for comparing the value of airflow amount against a preset value representing a desired airflow amount to thereby obtain an airflow error signal; and
a fan driving module, which is responsive to the airflow error signal from the comparison module to adjust the speed of the fan filter unit to thereby adjust the amount of airflow from the fan filter unit;
wherein the newly-resulted pressure difference by the adjusted airflow is detected by the differential pressure measuring module as feedback parameter and fed back to the airflow computation module and the comparison module to thereby obtain a new airflow error signal to adjust the speed of the fan filter unit until the amount of airflow from the fan filter unit is substantially equal to the preset desired amount.

6. The airflow feedback control apparatus of claim 5, wherein the bell nozzle is formed with an elliptically-curved inner wall.

7. The airflow feedback control apparatus of claim 5, wherein the differential pressure measuring module includes a pressure sensor which is installed on the bell nozzle on the fan filter unit at a position proximate to the outlet of the bell nozzle.

8. The airflow feedback control apparatus of claim 5, wherein the airflow computation module is based on a theoretical equation that represents the relation between airflow and pressure difference to obtain the value of airflow amount corresponding to the detected pressure difference between the upstream and the bell nozzle outlet.

9. The airflow feedback control apparatus of claim 5, wherein the airflow computation module is based on an empirically-obtained characteristic curve of airflow versus pressure difference to obtain the value of airflow amount corresponding to the detected pressure difference between the upstream and the bell nozzle outlet.

10. An airflow feedback control apparatus for use with a fan filter unit of the type having a fan and a bell nozzle having an inlet and an outlet and an elliptically-curved inner wall, for the purpose of controlling the fan filter unit to provide a substantially constant amount of airflow;
the airflow feedback control apparatus comprising:
a differential pressure measuring module for measuring the pressure difference;
an airflow computation module, which is based on an empirically-obtained characteristic curve of airflow versus pressure difference to compute for the value of airflow amount corresponding to the detected pressure difference between the inlet and the outlet;
a comparison module for comparing the value of airflow amount against a preset value representative of a desired airflow amount to thereby obtain an airflow error signal; and
a fan driving module, which is responsive to the airflow error signal from the comparison module to adjust the speed of the fan filter unit to thereby adjust the amount of airflow from the fan filter unit;
wherein the newly-resulted pressure difference is detected by the differential pressure measuring module as feedback parameter and fed back to the airflow computation module and the comparison module to thereby obtain a new airflow error signal to adjust the speed of the fan filter unit until the amount of airflow from the fan filter unit is substantially equal to the preset desired amount.

11. The airflow feedback control apparatus of claim 10, wherein the differential pressure measuring module includes a pressure sensor which is installed on the bell nozzle on the fan filter unit proximate to the outlet of the bell nozzle.

* * * * *